United States Patent [19]

Mahéo

[11] 4,177,759
[45] Dec. 11, 1979

[54] APPARATUS AND METHOD FOR COLLECTING OYSTERS

[75] Inventor: Guy Mahéo, Lezardrieux, France

[73] Assignee: Societe Civile G. M. Maheo - Conseil, Lezardrieux, France

[21] Appl. No.: 822,992

[22] Filed: Aug. 8, 1977

[30] Foreign Application Priority Data

Aug. 11, 1976 [FR] France .................. 76 24510

[51] Int. Cl.² ............................................ A01K 61/00
[52] U.S. Cl. ............................................ 119/4
[58] Field of Search ............................................ 119/4

[56] References Cited

U.S. PATENT DOCUMENTS

| 2,319,170 | 5/1943 | Toner | 119/4 |
| 3,853,095 | 12/1974 | Lawrence | 119/4 |

FOREIGN PATENT DOCUMENTS

| 1360273 | 3/1964 | France | 119/4 |
| 1362046 | 4/1964 | France | 119/4 |

*Primary Examiner*—Hugh R. Chamblee
*Attorney, Agent, or Firm*—Browdy and Neimark

[57] ABSTRACT

A method and a device for collecting oyster broods utilizing a collecting grill with the following features: (a) a rectangular frame onto which are attached a series of parallel bars, (b) a series of ribs encircling each bar, spaced the length of one oyster apart, and which rise above the bars, a height slightly less than the height of the lime coating, which forms on the grill.

A number of sections are formed by the intersection of the bars and ribs; each section is large enough for one oyster.

The oysters attach to the lime coating on each space. When a sudden force is applied to the grill, the coating and the oysters detach from the collector, without the oysters coming into contact with each other.

7 Claims, 5 Drawing Figures

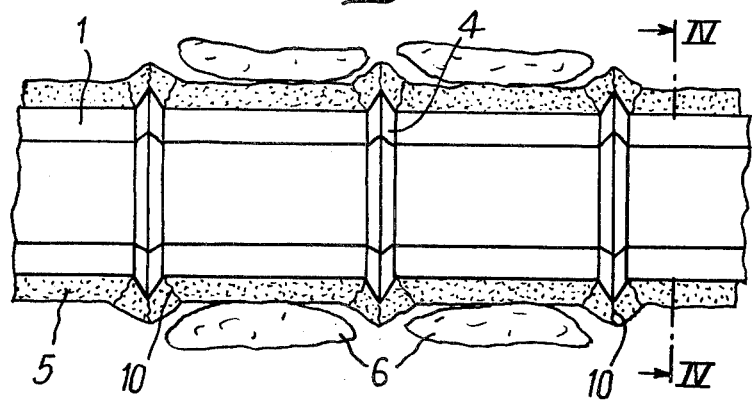
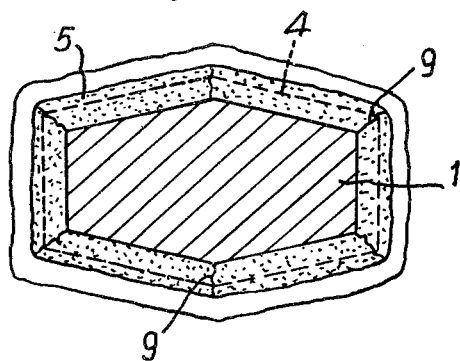
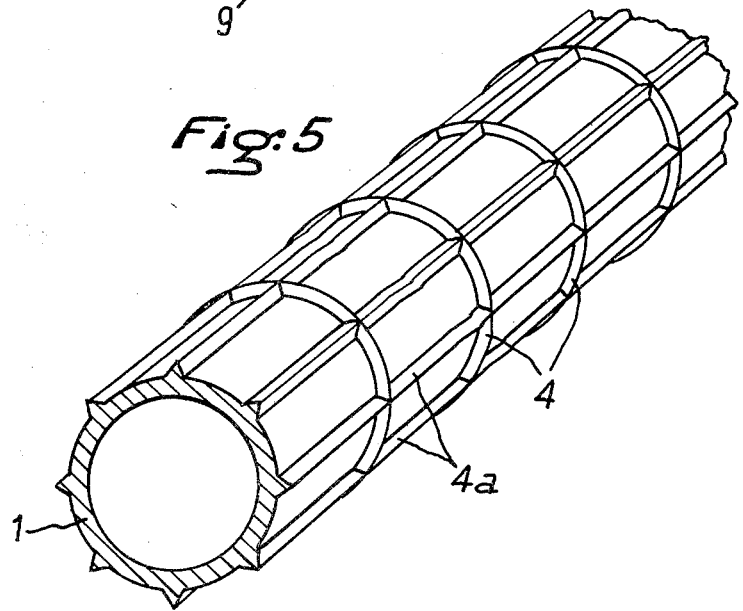

APPARATUS AND METHOD FOR COLLECTING OYSTERS

FIELD OF THE INVENTION

The present invention relates to a bar grill for collecting oyster broods and a method of collecting same.

BACKGROUND OF THE INVENTION

Oyster brood collecting grills are already known, for example from French Pat. No. 1,360,273. These grills are generally plane grills with suitably spaced parallel bars. The oyster brood which is fixed to the bars is gathered by means of blades in which grooves are provided which correspond to the bars of the grill and are displaced longitudinally in respect of these bars to loosen the brood. This method necessitates the disassembly of the grill units, then its reassembly prior to re-use when the brood has been gathered. Although these operations can now be achieved in a largely mechanical manner, they nevertheless remain long and tedious, and consequently impair the efficiency gained by using such grills.

It also has been proposed to detach the oyster brood from the collectors by subjecting the latter to impacts. Another problem then arises. The collectors of oyster brood are covered with a lime coating, with a thickness of the order of 1 mm, on which the young oysters become fixed. When the collectors are subjected to an impact, the coating and the oyster brood become detached from the collectors in sections of variable dimensions, some of these sections often comprising several oysters. In such close proximity, the development of the oysters is hindered, and their capacity to breed is endangered. The present invention overcomes these difficulties.

SUMMARY OF THE INVENTION

It is an object of the present invention to collect an oyster brood.

A further object of the present invention is to collect an oyster brood without endangering the subsequent breeding of the oysters.

Another object of the invention is to collect oysters without interfering with their development.

Another object of the invention is to collect an oyster brood in a manner that is not long, tedious, and costly.

An additional object of the invention is to collect an oyster brood without the need to disassemble the grill unit, with which the oysters were collected.

The present invention achieves these goals by using a modification of a bar grill, which is known in the prior art. The traditional grill consists of a rectangular frame onto which are attached a series of parallel bars. A lime coating, approximately 1 mm thick coats the grill, and it is to this coating that the young oysters attach.

The modification comprises a series of ribs which encircle some or all of the bars. The ribs which are spaced the length of one oyster apart, protrude from the bar a height slightly less than the height of the lime coating. When a sudden force is imparted to the grill, the oysters and the lime coating, together separate from the grill in such a way that none of the oysters overlap onto each other.

BRIEF DESCRIPTION OF THE DRAWINGS

FIG. 3 is a side view of the bar shown in FIG. 2;

FIG. 4 is a cross sectional view taken along the line IV—IV shown in FIG. 3; and FIG. 5 is a perspective view of a variant embodiment of the bar shown in FIG. 2.

DETAILED DESCRIPTION OF THE DRAWINGS

At least some bars of the grill, have ribs which encircle the bars and which cause the coating, which covers the bars, to start splitting when the grill is subjected to an impact. The separation of the ribs will depend upon the dimension of the young oysters. For example, in the case where the dimension of these oysters is of the order of 5 to 10 mm, the space between the ribs should be between 5 and 10 mm. Thus each oyster attaches to its own area, and is separated from its neighbors. With regard to the height of the ribs, it will preferably be slightly less than the thickness of the lime coating, i.e., less than approximately 1 mm. This height is generally sufficient for the coating to split at the level of the ribs when the grill is subjected to an impact.

When the bars are full profiles, for example, with a substantially rectangular cross section, this section is generally rather weak so that it is sufficient to cause splits in the transversal direction of the bars. In this case, said ribs are preferably perpendicular to the longitudinal axis of the bars.

The lime coating then splits, on the one hand, along the longitudinal edges of the bars and, on the other hand, at the level of the ribs.

However, in the case where the bars are formed from hollow profiles, such as cylindrical tubes, these bars preferably comprise a lattice if ribs parallel to their longitudinal axis and another lattice perpendicular to the first lattice.

These two lattices of ribs then determine splits in the coating according to substantially rectangular forms.

The present invention also relates to a method for collecting the oyster brood.

According to the invention, this method comprises obtaining, by any known means, the formation of oyster brood on a grill formed from ribbed bars as described above, then subjecting this grill to impacts so as to cause the splitting of the brood and the separation of the brood from the grill.

Compared with the method which comprises using blades as mentioned above, this method has the advantage of permitting, for its execution, the use of simpler means, while ensuring the splitting of the oyster brood into small dimensioned sections. Thus, an entire assembly of grills disposed parallel to each other can be subjected to impacts.

For example, one can transmit the impacts to the grill by placing this grill on supports and subjecting it to the action of a pneumatic hammer, or placing it upon a vibrating table.

In any event, the invention will be well understood by means of the description which follows, given in a nonlimiting manner by way of example, of some embodiments of the invention.

Figure 1:
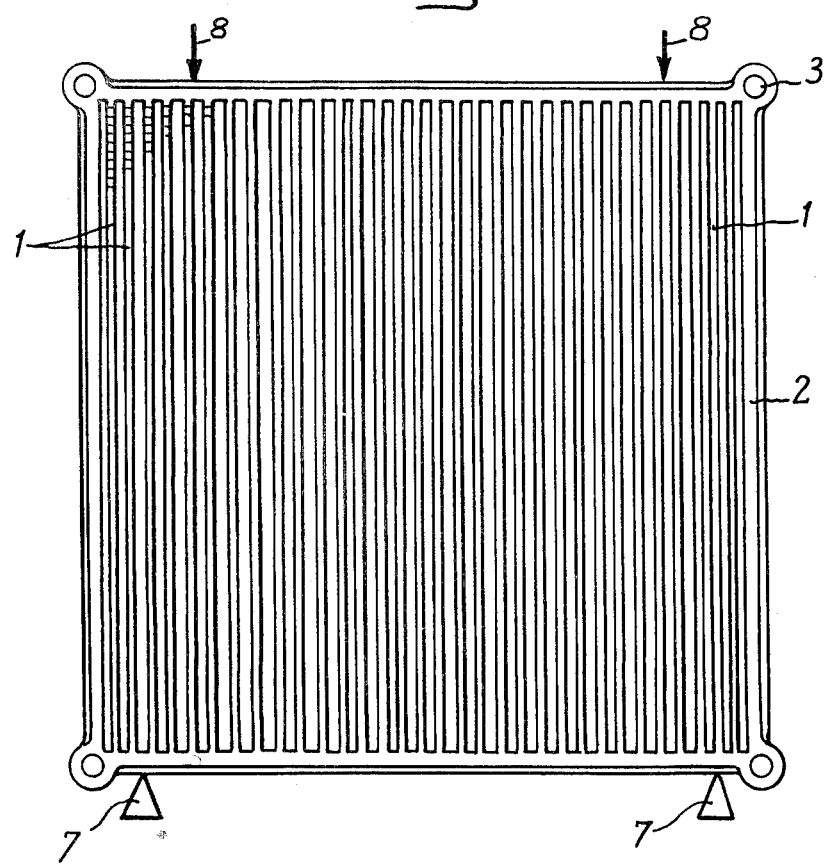
FIG. 1 shows a top plan view of a grill on which only a few ribs have been shown for simplification purposes.

The grill of FIG. 1 comprises an assembly of suitably spaced parallel bars 1 which are joined together by means of a frame 2 which may, for example, be molded from one single piece with the bars 1 if the grill is made of plastic material.

The frame 2, which preferably comprises four bars in the shape of an H, comprises at its corners apertures 3 in which cylindrical bars (rods) can be inserted so as to obtain an assembly of grills.

Figure 2:
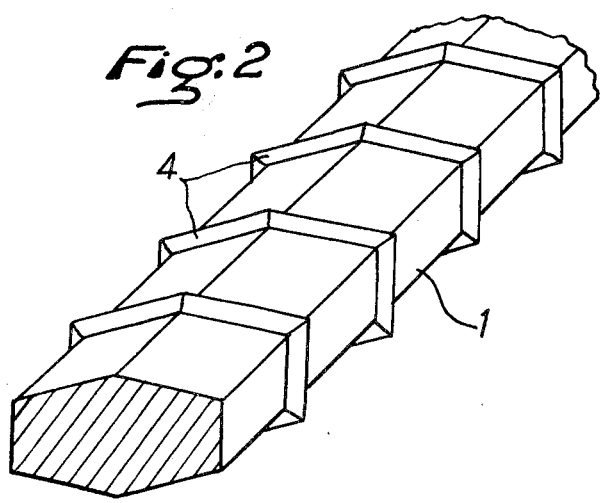
FIG. 2 is a perspective view of a portion of a bar in the grill shown in FIG. 1.

As shown in FIG. 2, the bars 1 are hexagonal in shape, with a very flat cross section. These bars have attached to them, at regular intervals, annular ribs 4 which are perpendicular to the longitudinal axis of the bar and completely surround this bar.

FIGS. 3 and 4 show the bar 1 covered with its lime coating 5. The ribs 4 extend beyond the surface by a height which is slightly less than approximately 1 mm, so that this height is substantially less than the thickness of the coating 5. The spacing between the ribs is of the same order of magnitude as the dimension of the young oysters 6 which will be gathered, i.e. it is between approximately 5 and 10 mm.

FIG. 5 represents a variant embodiment of the bars 1. In this variant, the bar has substantially the form of a cylindrical tube, but, to provide a resistance similar to that on the example shown with reference to FIG. 2, its diameter must be greater. Consequently, if it is desirable to obtain fragments of oyster brood of the same order of magnitude as above, it is necessary to add longitudinal ribs 4a to the transversal ribs 4.

For gathering of the oyster brood, the grills are subjected to vibrations. For this purpose, they may be disposed on fixed supports 7 and subjected to the action of a pneumatic hammer at the points indicated by the arrows 8. The vibrations are then sufficient to detach the brood and reduce it to elementary fragments.

In one variant, the supports 7 constitute a vibrating table.

When the grill is subjected to impacts or vibrations, radial splits 9 are produced in the layer of coating at the level of the angles formed by the section of the bars and other splits 10 are produced at the sites of the ribs. The brood is thus gathered in the form of sections which each comprise at most one oyster.

In the case where the bars are made of plastic material, the ribs are preferably cast from one single piece with these bars.

It will be obvious to those skilled in the art that various changes may be made without departing from the scope of the invention and the invention is not to be considered limited to what is shown in the drawings and described in the specification.

What is claimed is:

1. A frame with a series of parallel bars attached, which forms a grill for collecting oysters, wherein the improvement comprises a series of ribs, encircling at least some of said bars, said ribs being spaced slightly greater than the length of one oyster apart and rising above said bars; a lime coating formed over said bars and said ribs, the height of said ribs being substantially less than the thickness of said lime coating which is formed on said bars.

2. A grill according to claim 1, wherein said bars are hexagonal in cross section.

3. A grill according to claim 1, wherein said bars are cylindrical in cross section.

4. A grill according to claim 3, further including a second series of ribs, perpendicular to said series of ribs and parallel to the axis of said cylindrical bar, also spaced slightly greater than the length of one oyster apart.

5. A method of collecting oysters, the method comprising:
providing a grill in the form of a frame with a series of parallel bars attached, and a series of ribs, encircling at least some of said bars, said ribs being spaced slightly greater than the length of one oyster apart and rising above said bars; a lime coating formed over said bars and said ribs, the height of said ribs being substantially less than the thickness of said lime coating which is formed on said bars;
obtaining, by any known means, the formation of an oyster brood on said grill; and
subjecting said grill to impact so as to cause the oysters to detach individually from said grill.

6. A method of collecting oysters in accordance with claim 5, wherein said impact is obtained by placing the grill on supports and subjecting it to the action of a pneumatic hammer.

7. A method of collecting oysters in accordance with claim 5, wherein said impact is obtained by placing the grill on a vibrating table.

* * * * *